March 10, 1970          J. A. MARINO          3,499,315
CONTAMINATION DETERMINATION IN A FLUID SYSTEM
Filed Aug. 31, 1967
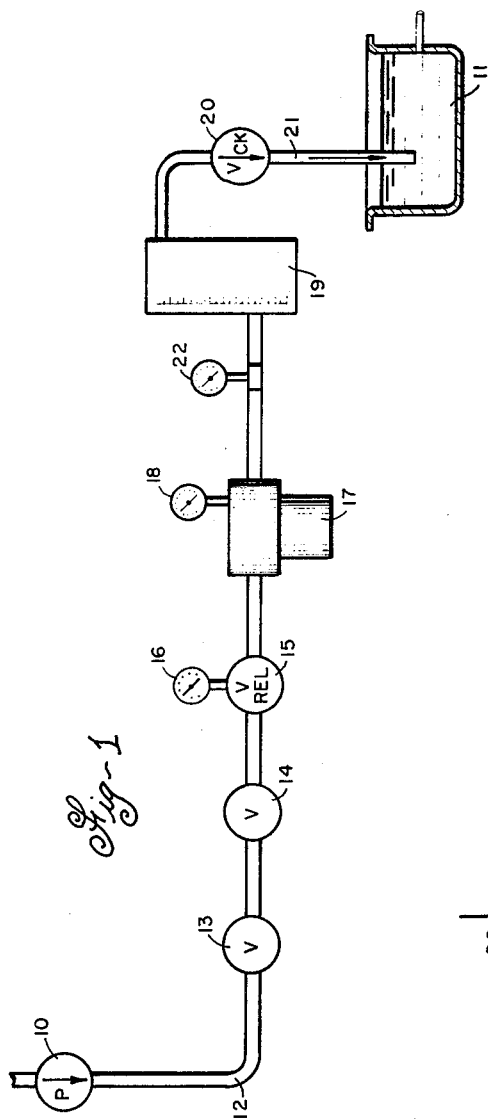
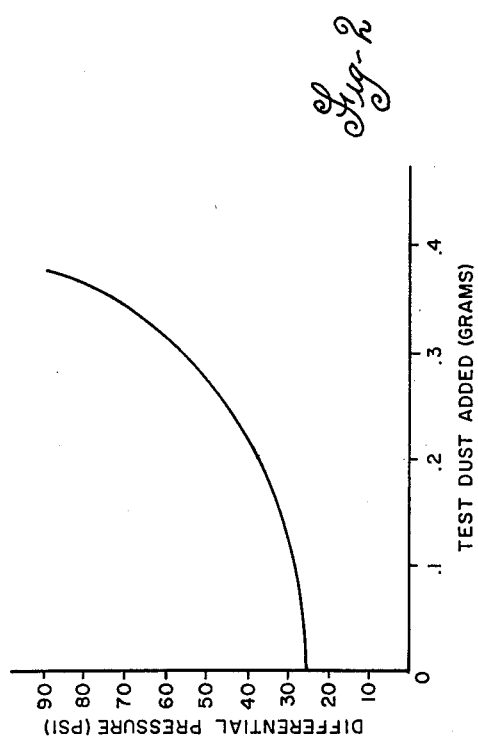
INVENTOR.
JOSEPH A. MARINO
BY
ATTORNEY

United States Patent Office 3,499,315
Patented Mar. 10, 1970

3,499,315
CONTAMINATION DETERMINATION IN A
FLUID SYSTEM
Joseph A. Marino, Blackwood, N.J., assignor to the United
States of America as represented by the Secretary of
the Navy
Filed Aug. 31, 1967, Ser. No. 665,684
Int. Cl. G01n 11/02
U.S. Cl. 73—61                                      1 Claim

ABSTRACT OF THE DISCLOSURE

A method for determining the contamination of a fluid system having a fluid reservoir at one end of the system and suction pump at the other end. A filter element is selected having a dirt holding capacity equal to the maximum acceptable limit of the system and placed between the pump and reservoir. The fluid is then drawn through the filter at a predetermined rate and the differential pressure produced across the filter element is recorded and indicated as the contamination level of the system.

---

The present invention related particularly to a fluid system for monitoring solids content so that a safe contamination level may be maintained.

Presently, the contamination level of a fluid system is determined from analysis of a 100 milliliter sample of fluid drawn from the system or that portion of the system to be tested. If extreme care is not taken in drawing this sample, considerable error may result in the final analysis. The sample is filtered through a membrane filter and the amount of contaminant determined by a lengthy microscopic counting procedure. This procedure is subject to a considerable amount of experimental error because of the extremely small fraction of the total fluid system being analyzed. For example, in a typical 12 gallon system only 0.2% of the total system volume is sampled.

In addition, the present procedure requires the employment of specially trained laboratory technicians skilled in the art of measuring minute quantities of contaminant. The microscope techniques employed, however, are long, tedious and difficult even for a trained microscopist. Moreover, if a laboratory is employed to analyze the fluid samples, the information obtained decreases in value because of the time required to complete the analysis and transmit and receive the results. This leads to costly shut-down time or the hazardous operation of a contaminated system.

It is therefore a principal object of the present invention to provide a novel method and apparatus whereby the contaminant content of a fluid system can be determined in a very short period of time by nontechnical personnel.

It is another object of the invention to provide an improved method whereby the fluid sample tested may approach the total system volume and thereby obtain increased accuracy.

It is a further object of the present invention to provide a novel and improved contamination measuring device wherein the determination is obtained at the fluid system location and wherein results are immediate so that a maximum utilization may be made of the information.

Other objects and many of the attendant advantages of this invention will be readily appreciated as the same becomes better understood by reference to the following detailed description when considered in connection with the accompanying drawing wherein:

FIGURE 1 of the drawing is a diagrammatic representation of a preferred embodiment of the invention; and FIGURE 2 of the drawing is a graph indicating the maximum allowable differential pressure for a system with a known maximum contamination level.

Referring now to the details of FIG. 1 of the drawing, the fluid to be tested is fed into the pump 10 from the reservoir 11 or any other suitable source not shown in the drawing. A flexible hose or conduit 12 is connected from the pressure side of the pump 10 to the series connected pair of valves 13 and 14. The valves 13 and 14 may be a pair of needle control valves, for example, or any other suitable conventional means to control the rate of fluid flow in the system while the test is being conducted.

The valve 14 is connected through a conduit to a pressure relief valve 15 and a pressure gauge 16. The pressure relief valve is included in the testing apparatus as an additional safety factor for the system and is not imperative to the proper functioning of the system and testing method.

The relief valve 15 communicates with a filter element 17, the proper selection of which depends on the fluid system being tested in a manner in which will be more apparent hereinafter. A pressure gauge 18 is connected across the filter element 17 for measuring the differential pressure present across the filter during testing of the system. The pressure gauge 18 is preferably a direct readout instrument, but may be of any approved type of instrument which is capable of indicating an increase in pressure across the filter 17, such as warning lights which would indicate when the pressure exceeded a predetermined limit.

The filter element 17 is connected through a flowmeter 19 and a check valve 20 to the reservoir 11 through the flexible hose or conduit 21. A temperature gauge 22 is preferably connected between the filter element 17 and the flowmeter 18 to monitor the fluid system temperature during testing so that the values of the differential pressure which are to be recorded are taken at a substantially constant temperature.

In operation, the size of the filter element 17 will vary depending on the size and contamination tolerance of the system to be tested. The filter element is selected and sized to have a dirt holding capacity equal to the maximum acceptable contamination limit of the system or that portion of the system tested. Once the filter element is selected, the maximum allowable differential pressure across the filter element is determined experimentally, and is equal to the differential pressure obtained at a dirt holding capacity equal to 50% of the maximum acceptable contamination limit of the system.

Referring now to FIG. 2, the values used in plotting the graph were obtained by testing a system using the embodiment shown in FIG. 1. A measured amount of fine air cleaner test dust was introduced into the filter element and the corresponding differential pressure across the filter element was recorded. The maximum differential pressure allowable for any system can be obtained from the graph shown in the drawing if the contamination limit of the system is known.

The maximum allowable differential pressure and required size filter (dirt holding capacity) for a system with a maximum acceptable contamination level of 0.4 gram, for example, would be obtained as follows: The dirt holding capacity of the filter would be 0.4 gram. The maximum allowable differential pressure would be obtained by taking 50% of the maximum allowable contamination limit of the system or 0.2 gram and reading the corresponding differential pressure which is 35 p.s.i. The contamination limit of a system would be determined experimentally using the foregoing procedure on new systems, systems following overhaul and systems in operation that are known to be operating satisfactorily.

Once the proper filter element is selected and connected as shown in FIG. 1, the system is started. The valve 13, initially closed, is slowly opened until a flow of approximately 20% greater than the selected test flow is obtained on flowmeter 19. The primary factor in selecting a proper test flow rate is that an initial pressure reading must be obtained on the gauge 18 to act as a reference point for later readings. However, a minimum flow rate of 0.25 g.p.m. is desirable in order to speed testing. The valve 14, initially open, is then slowly closed until the selected test flow rate is measured on the flowmeter 19. The fluid flow, temperature and the differential pressure across the filter element 17 are recorded at suitably spaced intervals of time. The test is terminated after a minimum of 25% of the total system volume has flowed through the filter element or if the differential pressure exceeds the maximum allowable for that system, indicating a contaminated system.

Obviously, many modifications and variations of the present invention are possible in the light of the above teachings. It is therefore to be understood that the invention may be practiced otherwise than as specifically described.

What is claimed is:
1. A method for determining whether excessive particulate contamination is present in a fluid system having a fluid reservoir and a pump, comprising the steps of:
   (a) selecting and sizing a filter element having a dirt holding capacity equal to the maximum acceptable contamination limit of the system;
   (b) temporarily connecting the filter element between the pressure side of the pump and the fluid reservoir of the system so that the fluid is drawn therethrough;
   (c) controlling the fluid flow of the system so that a constant test rate of at least 0.25 g.p.m. is maintained;
   (d) and monitoring the differential pressure produced across the filter element until at least 25% of the total system volume has flowed through the filter element or until the measured pressure exceeds that obtained at a dirt holding capacity equal to 50% of the maximum acceptable contamination limit of the system indicating a contaminated system.

References Cited
UNITED STATES PATENTS

| | | | |
|---|---|---|---|
| 2,678,134 | 5/1954 | Middleton. | |
| 2,985,020 | 5/1961 | Fisher | 73—38 X |
| 2,997,874 | 8/1961 | Billuris et al. | 73—61 |
| 3,208,267 | 9/1965 | Schatzberg | 73—61 |
| 3,287,961 | 11/1966 | Dwyer | 73—61.1 |
| 3,325,010 | 6/1967 | Sackett | 73—38 X |
| 3,357,236 | 12/1967 | Kasten | 73—61.1 |

LOUIS R. PRINCE, Primary Examiner

JOSEPH W. ROSKOS, Assistant Examiner

U.S. Cl. X.R.

73—38